US009232177B2

(12) United States Patent
Venkatasubramanian

(10) Patent No.: US 9,232,177 B2
(45) Date of Patent: Jan. 5, 2016

(54) VIDEO CHAT DATA PROCESSING

(71) Applicant: Intel Corporation, Santa Clara, CA (US)

(72) Inventor: Sankaranarayanan Venkatasubramanian, Tirunelveli (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/940,883

(22) Filed: Jul. 12, 2013

(65) Prior Publication Data

US 2015/0015663 A1    Jan. 15, 2015

(51) Int. Cl.
*H04N 7/14*   (2006.01)
*H04N 19/42*  (2014.01)
*H04N 19/44*  (2014.01)

(52) U.S. Cl.
CPC ......... *H04N 7/141* (2013.01); *H04N 19/00533* (2013.01); *H04N 19/42* (2014.11)

(58) Field of Classification Search
None
See application file for complete search history.

(56) References Cited

U.S. PATENT DOCUMENTS

| | | | | |
|---|---|---|---|---|
| 5,602,992 A * | 2/1997 | Danneels | | 709/248 |
| 6,677,976 B2 * | 1/2004 | Parker et al. | | 348/14.08 |
| 6,742,188 B1 * | 5/2004 | Del Castillo | | 725/153 |
| 6,829,303 B1 * | 12/2004 | Pearlstein et al. | | 375/240.25 |
| 7,248,590 B1 * | 7/2007 | Liu | | 370/395.64 |
| 7,458,894 B2 * | 12/2008 | Danieli et al. | | 463/42 |
| 7,808,988 B2 * | 10/2010 | Neff | | 370/389 |
| 8,358,379 B1 * | 1/2013 | Woodall | | 348/569 |
| 8,533,166 B1 * | 9/2013 | Sulieman et al. | | 707/693 |
| 8,542,265 B1 * | 9/2013 | Dodd et al. | | 348/14.08 |
| 8,681,228 B2 * | 3/2014 | Ejiri et al. | | 348/208.3 |
| 8,803,991 B2 * | 8/2014 | Konda | | 348/220.1 |
| 2003/0195998 A1 * | 10/2003 | Estrop | | 709/323 |
| 2004/0075745 A1 * | 4/2004 | Mance et al. | | 348/207.1 |
| 2004/0181796 A1 * | 9/2004 | Fedotov et al. | | 719/323 |
| 2005/0058307 A1 * | 3/2005 | Yang et al. | | 381/119 |
| 2005/0249196 A1 | 11/2005 | Ansari et al. | | |
| 2006/0007958 A1 * | 1/2006 | Kang et al. | | 370/476 |
| 2006/0023073 A1 * | 2/2006 | Li et al. | | 348/211.99 |
| 2006/0271971 A1 * | 11/2006 | Drazin | | 725/86 |
| 2007/0065122 A1 * | 3/2007 | Chatterton | | 386/126 |
| 2007/0070182 A1 | 3/2007 | Ryu et al. | | |
| 2008/0316362 A1 | 12/2008 | Qiu et al. | | |

(Continued)

FOREIGN PATENT DOCUMENTS

EP    1 768 406 A2    3/2007
JP    2007089188 A    4/2007

(Continued)

OTHER PUBLICATIONS

Extended Search Report received for European Patent Application No. 14176712.9, mailed on Sep. 19, 2014, 11 pages.

*Primary Examiner* — Curtis Kuntz
*Assistant Examiner* — Qin Zhu
(74) *Attorney, Agent, or Firm* — International IP Law Group, P.L.L.C.

(57) ABSTRACT

A graphics processing unit and a system are described herein. The graphics processing unit includes a decoder, a post processor, and a renderer. The decoder is to decode a video data stream from an incoming data stream. The post processor is to perform post-processing of the decoded video data stream. The renderer is to render the post processed video data stream and discard a null video data stream from a video chat application during a video chat session.

22 Claims, 10 Drawing Sheets

(56) References Cited

U.S. PATENT DOCUMENTS

| | | | |
|---|---|---|---|
| 2009/0028247 A1* | 1/2009 | Suh et al. | 375/240.25 |
| 2009/0060032 A1 | 3/2009 | Schmit et al. | |
| 2009/0092234 A1* | 4/2009 | St. Onge et al. | 379/88.13 |
| 2009/0144425 A1* | 6/2009 | Marr et al. | 709/226 |
| 2009/0184977 A1* | 7/2009 | Weybrew et al. | 345/604 |
| 2009/0315886 A1* | 12/2009 | Drive et al. | 345/428 |
| 2010/0056273 A1* | 3/2010 | Reville et al. | 463/31 |
| 2010/0161825 A1* | 6/2010 | Ronca et al. | 709/231 |
| 2010/0284472 A1* | 11/2010 | Liao et al. | 375/240.26 |
| 2010/0316133 A1* | 12/2010 | Matsuba | 375/240.25 |
| 2011/0102672 A1* | 5/2011 | Estrop | 348/448 |
| 2011/0216708 A1* | 9/2011 | Ling | 370/328 |
| 2011/0249077 A1* | 10/2011 | Abuan et al. | 348/14.02 |
| 2012/0092445 A1* | 4/2012 | McDowell et al. | 348/14.16 |
| 2012/0274808 A1* | 11/2012 | Chong et al. | 348/234 |
| 2012/0287344 A1* | 11/2012 | Choi et al. | 348/705 |
| 2013/0150161 A1* | 6/2013 | Kruglick | 463/34 |
| 2013/0293664 A1* | 11/2013 | Tsang et al. | 348/14.03 |
| 2013/0328997 A1* | 12/2013 | Desai | 348/14.02 |
| 2014/0002576 A1* | 1/2014 | Kaza et al. | 348/14.02 |
| 2014/0006977 A1* | 1/2014 | Adams | 715/758 |
| 2014/0043358 A1* | 2/2014 | Wang | 345/619 |
| 2014/0078265 A1* | 3/2014 | Ohba et al. | 348/47 |
| 2014/0082638 A1* | 3/2014 | Gan et al. | 719/323 |
| 2014/0092203 A1* | 4/2014 | Periyannan et al. | 348/14.09 |
| 2014/0098185 A1* | 4/2014 | Davari et al. | 348/36 |
| 2014/0118477 A1* | 5/2014 | Dodd et al. | 348/14.13 |
| 2014/0176548 A1* | 6/2014 | Green | 345/426 |
| 2014/0269401 A1* | 9/2014 | Gondi et al. | 370/253 |

FOREIGN PATENT DOCUMENTS

| | | |
|---|---|---|
| JP | 2012508485 A | 4/2012 |
| WO | 2010054011 A2 | 5/2010 |

* cited by examiner

200

VIDEO CHAT DATA PROCESSING

BACKGROUND ART

Video chat applications enable a user of a computing system to communicate with at least one user of another computing system by transmitting video chat data from one computing system to the another computing system across a network, such as the Internet. The video chat data may be encoded using a codec at the one computing system, then packaged according to network protocols and sent across the network. The encoded video chat data may be received at the another computing system from the network, extracted from the package, and decoded using the codec. As the video chat data is encoded and decoded, the particular codec used by the video chat application may not be revealed to other components and modules of the one computing system or the another computing system.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
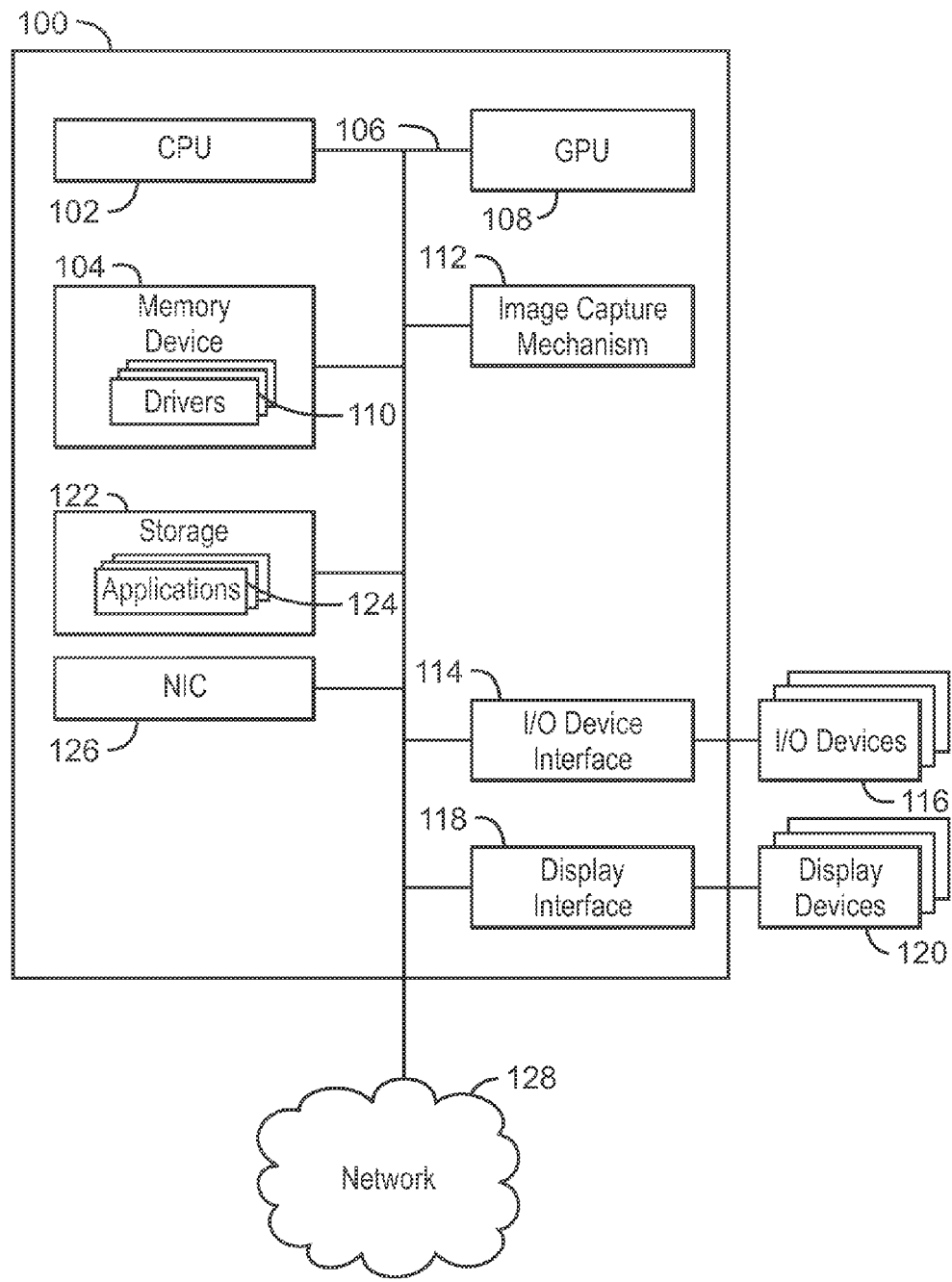
FIG. 1 is a block diagram of a computing device that may be used with video chat data processing.

Video chat data includes the images, text, audio, and video associated with a video chat session. Each video chat application encodes or decodes the graphics portion of the video chat data using a codec. A codec is a software or hardware component of a computing device that can encode or decode a stream of data. In some cases, the data is encoded and decoded for data compression purposes. The graphics portion of the video chat data includes raw video data. A video chat application typically implements a codec using software algorithms to compress the data stream. The software algorithms used by the video chat application to implement a codec are executed using the central processing unit (CPU). However, hardware encode and decode functionality is available on most computing systems through graphics hardware. Graphics hardware includes, but is not limited to, a graphics processing unit (GPU), fixed function hardware, video encode logic, video decode logic, and graphics engines.

Video chat applications typically perform the encode or decode functions without using the graphics hardware, as standard interfaces with the graphics hardware may not be available. In some cases, the graphics hardware is capable of faster, more efficient hardware based encoding and decoding when compared to the software encoding and decoding functions of video chat applications. Additionally, by using the CPU to execute encode and decode functionality of a video chat application, the power consumption during video chat may be relatively high. Moreover, the performance of the video chat application may result in the rendered video being slow or choppy, depending on the data throughput of the CPU.

Embodiments described herein enable video chat data processing. In some embodiments, the graphics, camera, and network drivers may be embedded with intelligence or logic that transfers encode, decode, and post-processing functionality from the video chat application to the graphics hardware. In this manner, the performance of the video chat is enhanced, where enhanced performance may refer to the improved quality of the video, text, images, and sound presented to the user as well as improved system power consumption. Furthermore, in some embodiments, the graphics hardware may process video chat data when standard interfaces with the graphics hardware are not available. For ease of description, a destination computing system and a source computing system are used to describe functions during a video chat session. However, a single system can perform the functions of the destination computing system and the source computing system simultaneously. Moreover, any number of computing systems can participate in a video chat session.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all refer-ring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing device 100 that may be used with video chat data processing. The computing device 100 may be, for example, a laptop computer, desktop computer, ultrabook, tablet computer, mobile device, smart phone, smart TV, or server, among others. The computing device 100 may include a central processing unit (CPU) 102 that is configured to execute stored instructions, as well as a memory device 104 that stores instructions that are executable by the CPU 102. The CPU 102 may be coupled to the memory device 104 by a bus 106. Additionally, the CPU 102 can be a single core processor, a multi-core processor, a computing cluster, or any number of other configurations. Furthermore, the computing device 100 may include more than one CPU 102.

The computing device 100 may also include a graphics processing unit (GPU) 108. As shown, the CPU 102 may be coupled through the bus 106 to the GPU 108. The memory device 104 may store instructions that are executable by the GPU 108. The GPU 108 may be configured to perform any number of graphics operations within the computing device 100. For example, the GPU 108 may be configured to render or manipulate graphics data such as graphics images, graphics frames, videos, or the like, to be displayed to a user of the computing device 100. The graphics data may be rendered during a video chat session.

The memory device 104 can include random access memory (RAM), read only memory (ROM), flash memory, or any other suitable memory systems. For example, the memory device 104 may include dynamic random access memory (DRAM). The memory device 104 includes one or more drivers 110. The drivers may include device drivers such as a graphics driver, a network driver, or a camera driver. In some examples, hardware components such as a graphics encoder may be operated by an encoding module of the graphics driver. Similarly, in some examples, a graphics decoder may be operated by a decoding module of the graphics driver. The computing device 100 also includes an image capture mechanism 112. In some embodiments, the image capture mechanism 112 is a camera, webcam, stereoscopic camera, scanner, infrared sensor, or the like. The image capture mechanism 112 may be used to capture graphics data, such as a video data stream or an image, during a video chat session.

The graphics driver, the network driver, the camera driver, or any combinations thereof, can detect that the video chat application has initialized or started a video chat session using hints. In some cases, a hint is any action that can indicate the start of a video chat session. The graphics, network, and camera drivers may each receive different hints based on the manner in which the video chat session was initialized by the video chat application. For example, the graphics driver may receive a call from the video chat application to create surfaces for rendering the video that is displayed during a video chat session. In such an example, the call received serves as a hint to the graphics driver of an impending video chat session. In another example, the camera driver may receive a notification or request for access to the camera functionality from the video chat application. In such an example, the notification or request serves as a hint to the camera driver of an impending video chat session. Furthermore, as an example, the network driver may detect data packets that are being sent or received by the video chat application. In such an example, the detection of data packets to or from the video chat application may serve as a hint to the network driver of an impending video chat session.

A user-mode module of each device driver may also be used to detect hints that indicate the start of a video chat session. The user-mode module of a device driver enables the device driver to execute in the user-mode space of a computing system, rather than in the privileged space of the kernel mode. By executing in the user-mode, the device drivers call an application programming interface (API) to access system hardware. In some embodiments, a user-mode module of the device driver may determine the identity of the application that is requesting service from the device driver. When the application requesting service is a video chat application, the device driver may use the request by the video chat application as a hint that a video chat session has been initialized.

When a hint that a video chat session has been initialized is detected, the encoding, decoding, and post-processing functionality can be transferred from the video chat application to the GPU hardware. Typically, the GPU hardware is specialized for media functions such as encoding, decoding, and post-processing. In some examples, the video codec format used by the video chat application may be implemented by the encoder hardware and the decoder hardware of the GPU subsystem. The specialized GPU hardware can provide faster, more efficient encoding, decoding, and post-processing functionality when compared to the encoding, decoding, and post-processing functionality of the video chat application. Typically, the video chat application implements such functionality using software, as discussed above. Accordingly, the performance of the video chat application may be improved by using the GPU hardware. Furthermore, the computing device can save power by using the GPU hardware for the encoding, decoding, and post-processing functionality of the video chat application.

The CPU 102 may also be connected through the bus 106 to an input/output (I/O) device interface 114 configured to connect the computing device 100 to one or more I/O devices 116. The I/O devices 116 may include, for example, a keyboard and a pointing device, wherein the pointing device may include a touchpad or a touchscreen, among others. The I/O devices 116 may be built-in components of the computing device 100, or may be devices that are externally connected to the computing device 100.

The CPU 102 may be linked through the bus 106 to a display interface 118 configured to connect the computing device 100 to one or more display devices 120. The display devices 120 may include a display screen that is a built-in component of the computing device 100. The display devices 120 may also include a computer monitor, television, or projector, among others, that is externally connected to the computing device 100.

The computing device also includes a storage device 122. The storage device 122 is a physical memory such as a hard drive, an optical drive, a thumbdrive, an array of drives, or any combinations thereof. The storage device 122 may also include remote storage drives. The storage device 122 also includes applications 124. The applications 124 may include a video chat application. The computing device 100 may also include a network interface controller (NIC) 126 configured to connect the computing device 100 through the bus 106 to a network 128. The network 128 may be a wide area network (WAN), local area network (LAN), or the Internet, among others. The data transmitted across a network is described as streaming data, wherein the streaming data includes data that is in packets according to a network protocol. The packet data includes, but is not limited to, image frames and corresponding audio data.

The block diagram of FIG. 1 is not intended to indicate that the computing device 100 is to include all of the components shown in FIG. 1. Further, the computing device 100 may include any number of additional components not shown in FIG. 1, depending on the details of the specific implementation. Moreover, the computing device 100 may be implemented as a system on chip (SOC). In an SOC implementation, various components of the computing device 100 are combined onto a single chip substrate.

In some embodiments, the video chat application may send a notification to the graphics driver to create a surface that is to render video processed by the video chat application. In some cases, a surface is an area of memory where graphics data is written. In examples, when using APIs such as those provided by DirectX®, the surface created at the request of the video chat application is a render target surface, which may be located in an area of memory that is not managed by the GPU hardware. As a result, the GPU will track the surface created at the request of the video chat application by setting a flag for each surface. In examples, the flag may be stored by the graphics driver software. Additionally, in examples, a table may be used to indicate the allocated surfaces along with a Boolean value to indicate if the surface is tracked. During a render operation from the application, if the application asks a specific surface to be rendered and the graphics driver has a flag set against this surface, the graphics driver performs a video post processing on the surface that contains the decoded data and will not render the surface generated by the application. This process may be known as trapping the surface.

The graphics driver may also change the create surface notification sent by the video chat application from a render target surface to a video process render target surface. In this manner, the surfaces created by the video chat application are converted from a render target surface to a video process render target surface. Video process render target surfaces are managed by the GPU hardware. Further, in some embodiments, the video process render target surface may be located on the graphics card. The graphics driver may also create additional surfaces for decode render targets. The decode render targets may be used to send decoded graphics data to the post processing engine. The graphics driver can also inform the network driver and the camera driver that a video chat session has been initiated by the video chat application.

Even when the video chat application does not have any active video calls or conferences, the network driver may monitor the ports used for sending or receiving video chat data packets for any video chat application activity. If the network driver detects a packet from the video chat application, it marks the traffic from the video chat session as a means of tracking the video chat session. In some cases, the network driver may mark the traffic by using marker bits or any other marking mechanism. The network driver can detect a packet from the video chat application through examining the packet header or data inspection. The network driver may then inform the graphics driver and the camera driver that a video chat session has been initialized.

The manner in which the device drivers are notified of a new video chat session occurs according to how the video chat session is initialized by the video chat application, as well as the video chat features used by the video chat application during the video chat session. In a video chat session, computing systems may be designated as source computing systems and destination computing systems. In some cases, the source computing system is a computing system that is sending video chat data, while a destination computing system is a computing system that receives video chat data. Each computing system may be both a source computing system and a destination computing system simultaneously during the video chat session. However, for ease of description, each computing system is described as a source computing system or a destination computing system.

Consider the scenario where an image capture mechanism, such as a webcam, is absent from a source computing system. The source computing system may send video chat data to a destination computing system, where the video chat data includes audio and text. In this case, neither the graphics driver nor the camera driver will participate in the workflow at the source computing system, as an image capture mechanism is not present within the source computing system and the graphics hardware has no graphics data to process. Accordingly, the network driver of the source computing system may be the first driver to detect a new video chat session through the use of various hints. The network driver may notify the other drivers of the new video chat session. When no video stream is transmitted to the destination computing system due to the lack of a webcam, the graphics driver of the destination computing system does not enable decoding or post-processing functionality of the graphics hardware, as there is no graphics data to process. Accordingly, the manner in which the drivers are notified of an impending video chat session depends on the features of the video chat session.

Figure 2:
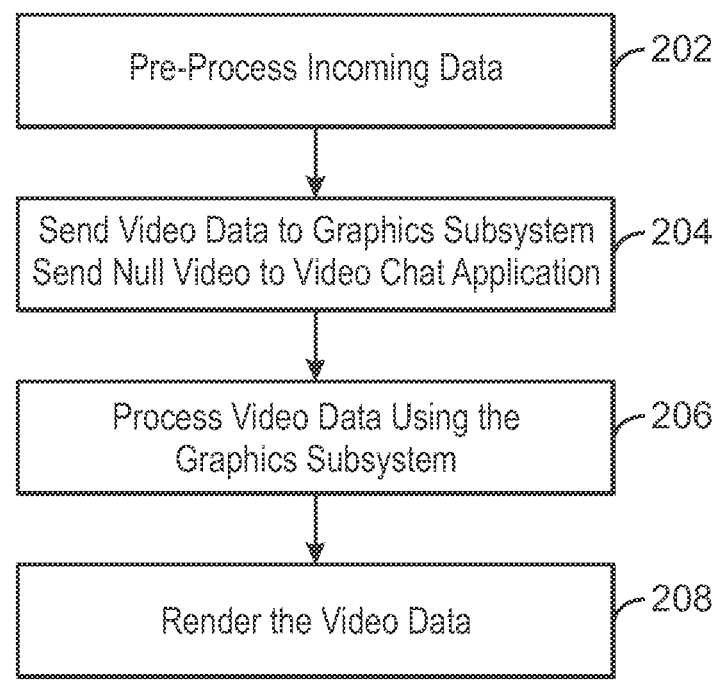
FIG. 2 is a process flow diagram of a method that enables video chat data processing.

FIG. 2 is a process flow diagram of a method 200 that enables video chat data processing at a destination computing system. In some examples, the video chat data may be formatted into data packets with various headers according to a networking protocol. Networking protocols include, but are not limited to, the Hyper Text Transfer Protocol (HTTP), the Transmission Control Protocol (TCP), the Internet Protocol (IP), the User Datagram Protocol (UDP), and the Real Time Communication (RTC) protocol. At block 202, the incoming data packets are pre-processed. Pre-processing the data packets includes ripping the video data from the data packet and sending the video data to the graphics driver for decoding. In some examples, the network driver may rip the video data stream from the incoming data stream. As discussed above, the network driver may detect a packet associated with the video chat application through port inspection or deep packet header inspection. In some embodiments, another module other than the network driver may be used to rip the video data stream from the incoming data stream.

At block 204, the video data stream is sent to the graphics subsystem while a null video stream is sent to the video chat application. In some embodiments, the network driver is used to route the video data stream from the video chat application to the graphics subsystem. The null video stream, sent to the video chat application, is a place holder for the actual video data that is processed by the graphics hardware. In some embodiments, a packet containing the audio data stream from the incoming data stream is sent to the video chat application along with the null video stream. The video chat application can recognize the audio data stream as an audio session and process the audio data stream so that the audio data stream can be rendered.

In some embodiments, the network driver may rip the video data onto a shared area or memory. This area of memory may be shared by the graphics hardware and the network driver. The network driver rips the video data to the shared memory, and then informs the graphics driver that there is video data in the shared memory that is waiting to be consumed by the graphics subsystem.

At block 206, the video data stream is processed using the graphics subsystem. In some embodiments, the graphics hardware receives the video data stream and then decodes the stream. The graphics hardware may also perform post-processing such as color conversion, scaling, and de-interlacing of the video data. Furthermore, the graphics subsystem can perform any additional image enhancement operations on the decoded video data stream, including, but not limited to, skin toning, and hue, saturation and brightness controlling. While the graphics subsystem performs post-processing of the decoded video data stream that was received from the network, the video chat application performs decoding and post-processing functions on the null video stream simultaneously. However, as the null stream is a placeholder, the packets sent to the video application do not contain any data. As a result, the no data processing is done by the video chat application. In this manner, the video chat application functions in the same manner as when the video data is sent to the video chat application.

At block 208, the processed video data is rendered. When the video chat application calls the graphics driver for rendering, the graphics driver traps the surfaces so that the placeholder data from the video chat application is not rendered onto the surface. The graphics driver renders the processed video data stream from the graphics subsystem onto the surface. In some cases, trapping the surface refers to the process by which the graphics driver prevents the video chat application from accessing the surfaces. The graphics driver may discard or ignore any data received from the video chat application for rendering. In some embodiments, the surfaces are trapped according to the flag that was set by the graphics driver when the video chat application sent a request to create the surfaces. The video chat application executes a render function to these surfaces, even when the video chat application receives a null video stream for processing, as the video chat application is unaware that it is not handling the decode and post processing of the video data stream. The video may be rendered to a display from the surface.

Figure 3:
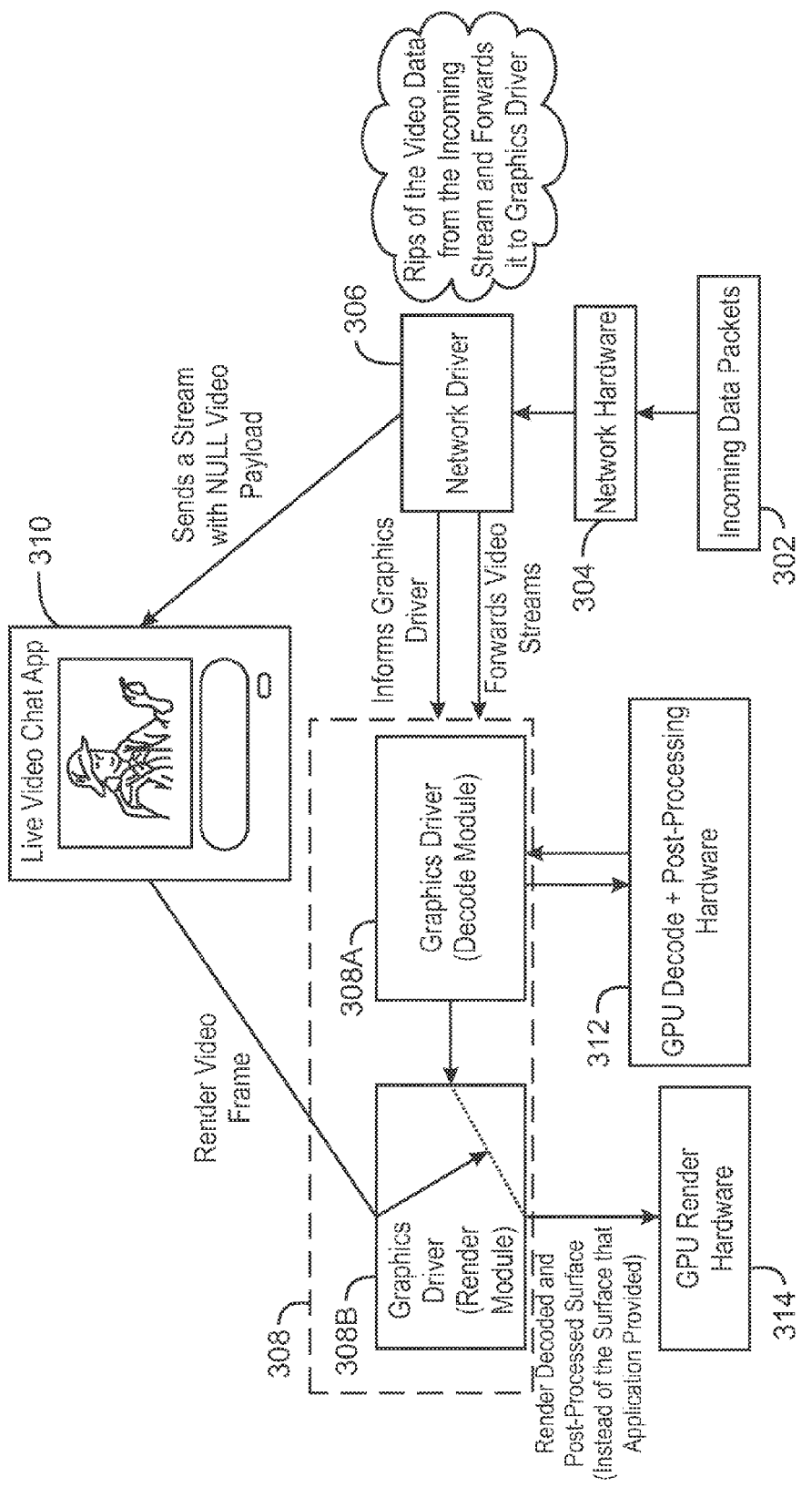
FIG. 3 is an illustration showing a manner of decoding incoming video chat data.

FIG. 3 is an illustration 300 showing a manner of decoding incoming video chat data at a destination computing system. Incoming data packets 302 from a network are received by network hardware 304. In some embodiments, a network driver 306 detects the video chat data received by the network hardware 304. Upon first detection of video chat data received by network hardware, the network driver 306 may inform the graphics driver 308 of the video chat session. The graphics driver, after receiving this notification, can track surfaces created by the video chat application 310. The network driver 306 may cause the network hardware 304 to separate the video data stream from the incoming data stream. The network hardware 304 may also forward the video data stream to a decode module 308A of the graphics driver 308. The network driver 306 also causes the network hardware 304 to send a null video stream to the video chat application 310.

The decode module 308A of the graphics driver 308 causes the graphics decode and post-processing hardware 312 to perform decoding and post-processing functions on the video data stream as described above. A render module 308B of the graphics driver 308 then causes the GPU Render Hardware 314 to render the decoded and post-processed data. The render module 308B of the graphics driver 308 is aware that the data sent by the video chat application at block 310 is "dummy" data. Any video data from the video chat application is ignored. In some embodiments, the render module 308B of the graphics driver 308 writes the decoded and post processed video data stream from the graphics decode and post-processing hardware 312 to a surface to be rendered.

Figure 4:
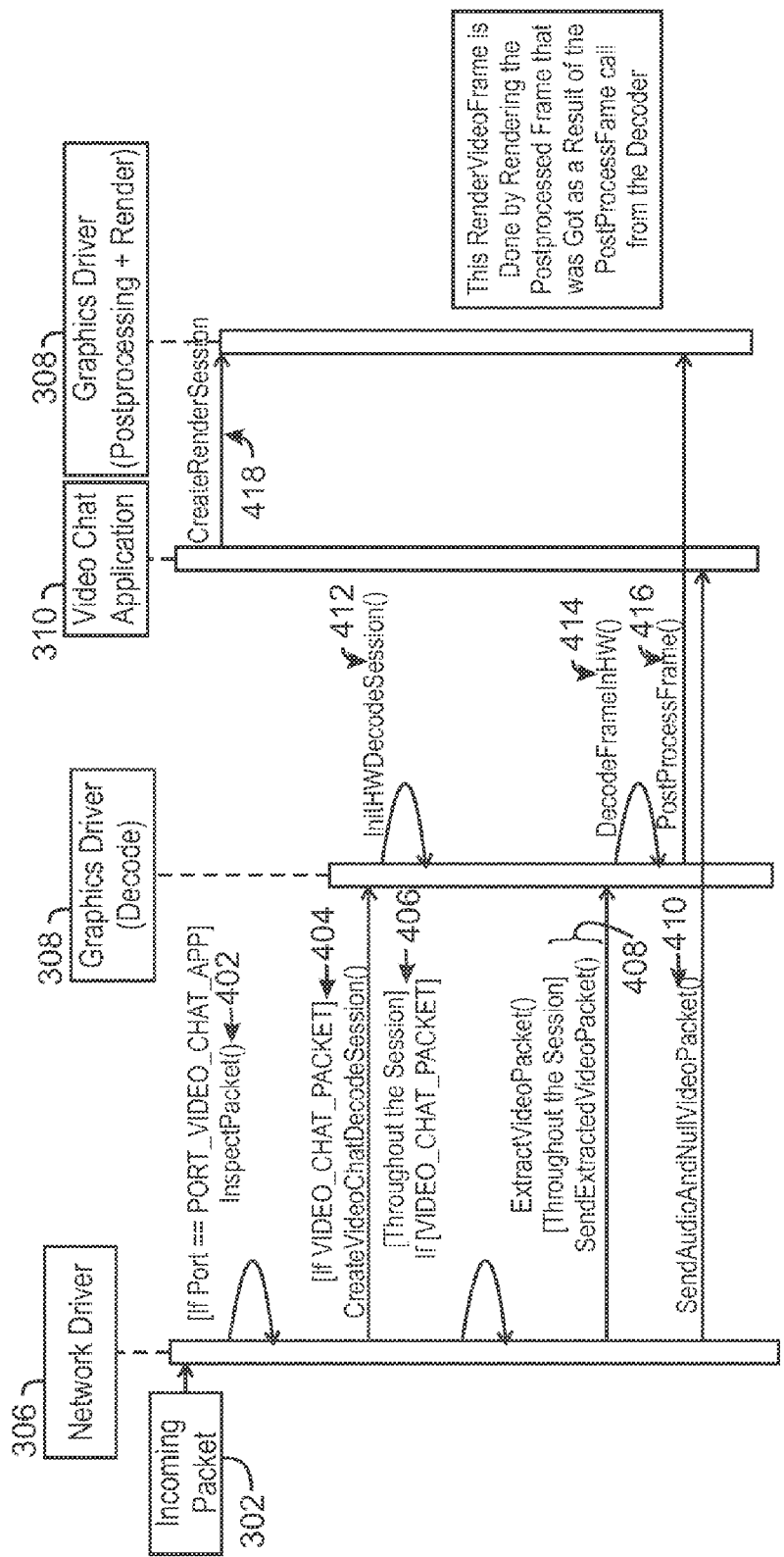
FIG. 4 is a control flow diagram of a system showing a manner of decoding incoming video chat data.

FIG. 4 is a control flow diagram of a system 400 showing a manner of decoding incoming video chat data. Incoming data packets 302 are input to the system 400. The network driver 306 inspects the port where video data enters the system at reference number 402. At reference number 404, if the incoming data packet is a video chat packet, then a video chat decode session is created, and the data is sent to the graphics hardware. As shown at reference number 406, whenever a video chat packet is detected, the video data is extracted from each packet of data. At reference number 408, the extracted video packet is sent to the graphics hardware to be decoded. The decode module 308A of the graphics driver may operate the graphics hardware in order to decode the video data. Additionally, at reference number 410 the network driver instructs the network hardware to send a null video stream and the audio data extracted from the incoming data packet to the video chat application 310.

A decode session may be initiated at reference number 412. In the decode session, the incoming frames from the video data stream are continually decoded using the graphics hardware as indicated at reference number 414. At reference number 416, post-processing is performed on the video data frames. Accordingly, the graphics driver 308 may cause the graphics hardware to post-processing the decoded video data and render the data as discussed above. The video chat application 310 sends video data to be rendered at reference number 418. However, the video data from the video chat application 310 is not rendered, as the packets processed by the video chat application were null data packets, and the resulting video surface contains no information. The graphics driver 308 causes the decoded and post-processed frames received from the graphics hardware to be rendered.

Figure 5:
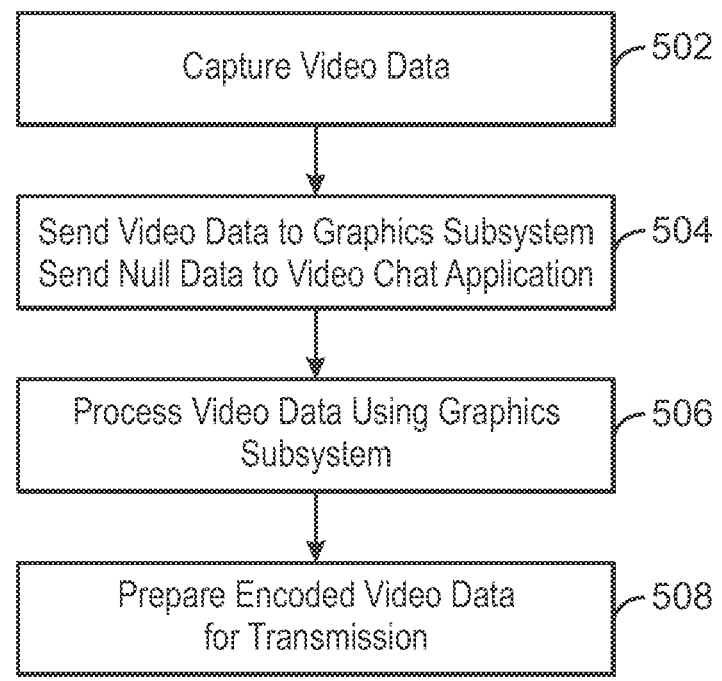
FIG. 5 is a process flow diagram of another method that enables video chat data processing.

FIG. 5 is a process flow diagram of a method 500 that enables video chat data processing at a source computing system. The device drivers may use hints to detect the start of a video chat session. In this manner, the drivers can re-route video chat data so that it may be processed by the graphics subsystem. In some examples, the camera driver may inform the graphics driver and the network driver that a video chat session has been started the camera driver detects a request for access from the video chat application.

At block 502, the video data is captured. In some embodiments, an image capture mechanism such as a camera is used to capture the video data. Moreover, audio data may be captured using a microphone. At block 504, the camera driver causes the image capture mechanism to send the captured video data to the graphics subsystem for encoding. Particularly, the captured video data may be sent to an encoder of the graphics subsystem. The camera driver also causes the image capture mechanism to send null video data to the video chat application. The audio captured by the microphone is also sent to the video chat application, so that the resulting packet from the video chat application includes the correct audio and null video. At block 506, the captured video data is processed using the graphics subsystem. In some embodiments, the encode module of the graphics driver uses the graphics hardware, such as an encoder, to encode the captured video data.

At block 508, the encoded data from the graphics subsystem is prepared for transmission across a network. In some embodiments, the encoded data is sent to the network driver. The network hardware can intercept the packet sent from the video chat application for transmission across the network, and repackage the packet by inserting the encoded video data from the graphics subsystem. Then the repackaged packet is then sent across the network according to the network protocol. In some embodiments, as the network hardware repackages the packet by inserting encoded data from the graphics subsystem, the network header information remains intact. For example, the network subsystem may use the packet header to keep track of the number of bytes that are sent in the packet. When the encoded video data from the graphics subsystem is inserted into the packet that is sent from the video chat application, the packet header may be modified to reflect the changes in packet size, thus maintaining accurate header information. Such packaging is performed in accordance with the underlying networking protocol. This will ensure the packet that is transmitted will not be rejected when it is received.

In some embodiments, the render module of the graphics driver causes the graphics subsystem to render the captured video data alongside the received video data within the video chat application of a source computing system. For example, a video chat application may render the received video chat data in a larger portion of the video chat application, while rendering the source video data in a smaller portion of the video chat application so that a user can see their own image. In such a scenario, the graphics subsystem re-uses the raw video stream forwarded by the image capture mechanism when it is called for presenting this source data. In some embodiments, color space conversion and scaling may be performed by the graphics hardware before the captured source data is rendered on the same computing system.

Figure 6:
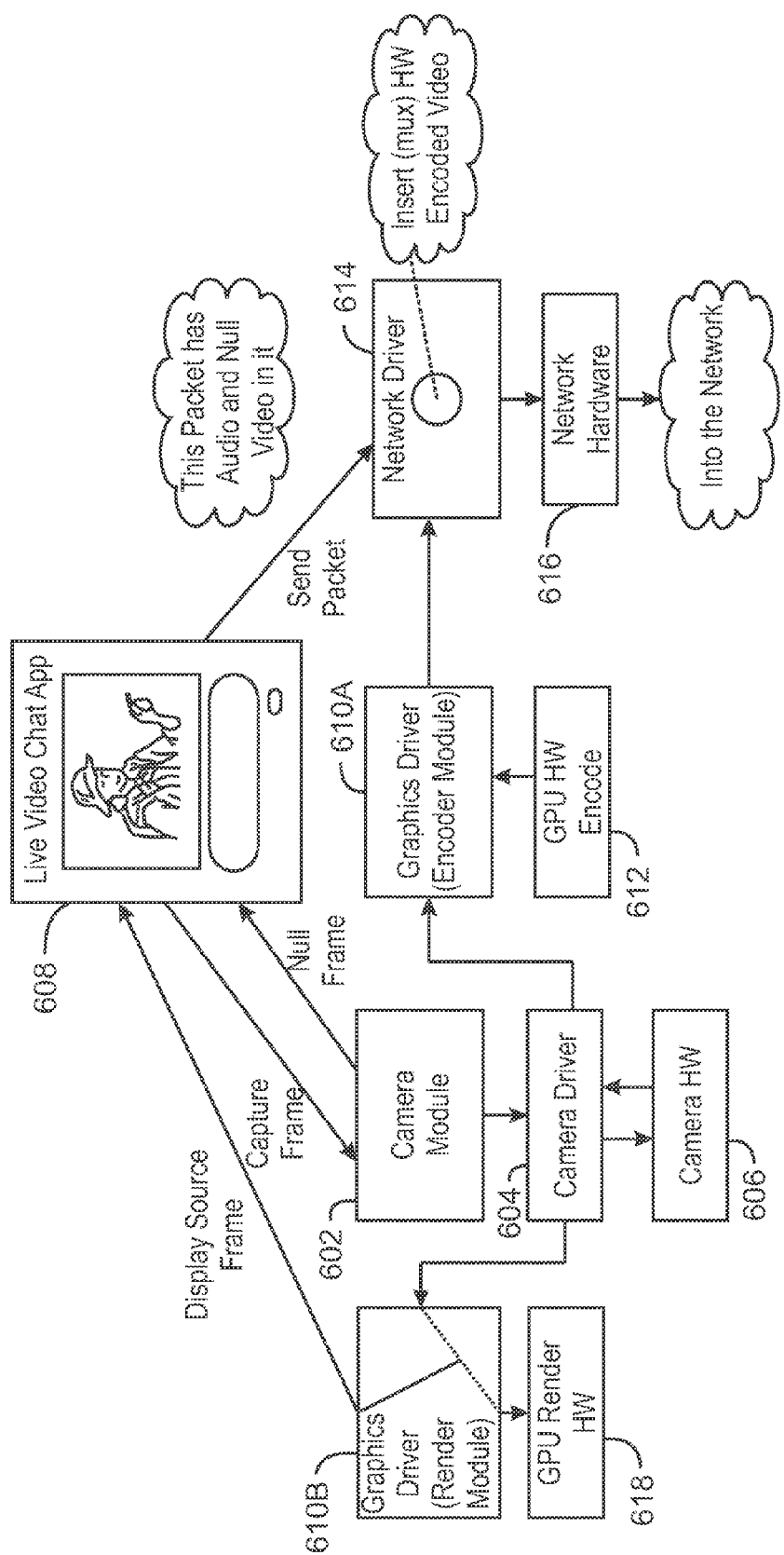
FIG. 6 is an illustration showing a manner of encoding captured video chat data.

FIG. 6 is an illustration 600 showing a manner of encoding captured video chat data at a source computing system. The camera software 602 is used to control the capture of raw video data using the camera driver 604 and the camera hardware 606. The camera software 602 sends null video data to the video chat application 608. The camera driver 604 causes the captured video data to be sent from the camera hardware 606 to the encoding hardware 612 of the graphics subsystem. The camera driver 604 may also inform the encode module 610A of the graphics driver and the render module 610B of the graphics driver that a video chat session has started.

The encode module 610A of the graphics driver communicates with the network driver 614 so that the packet received from the video chat application can be repackaged. The encoded video data is sent to the network hardware 616 from the encoding hardware 612 of the graphics subsystem. The network driver 614 causes the packet from the video chat application 608 to be combined with the encoded video data from the encoding hardware 612 of the graphics subsystem.

In some embodiments, a multiplexer is used to combine the encoded video data from the encoding hardware 612 of the graphics subsystem with the data packet from the video chat application 608 that includes audio and null video. The multiplexer may be implemented in hardware or software. The network hardware 616 is used to transmit the repackaged data packet across the network.

The camera driver 604 also causes the captured video data from the camera hardware 606 to be sent to the GPU render hardware 618 of the GPU subsystem by communicating with the render module 610B of the graphics driver. The render module 610B may cause the render hardware 618 of the graphics subsystem to render video data captured by the camera hardware 606, thereby rendering the captured video data at the same computing system. In some embodiments, the video chat application 608 renders the source video data alongside the video and audio data received from a remote computing system.

Figure 7:
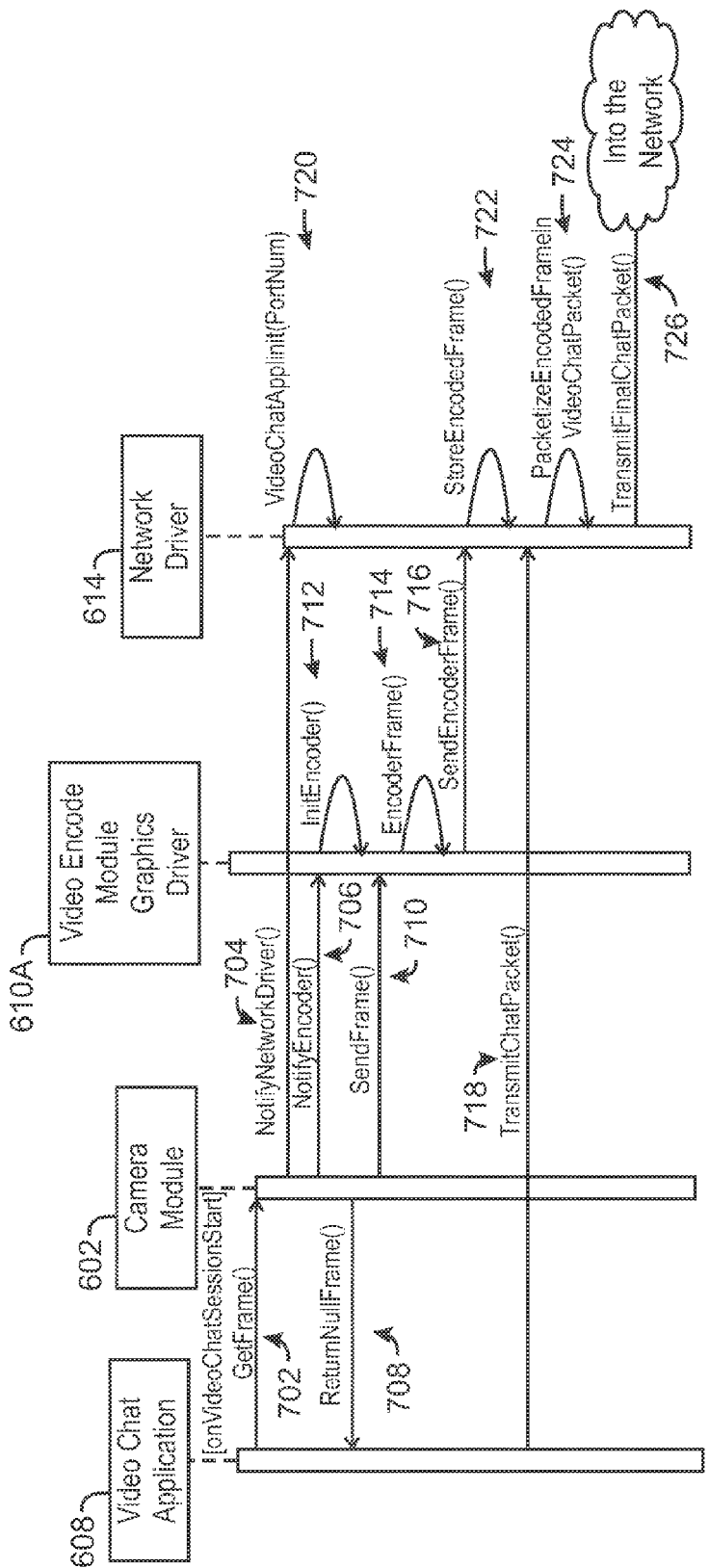
FIG. 7 is a control flow diagram of a system showing a manner of encoding captured video chat data.

FIG. 7 is a control flow diagram of a system 700 showing a manner of encoding captured video chat data. The video chat application captures video frames at reference number 702 by synchronizing with the camera module 602. In some embodiments, the synchronization includes requesting raw video data from the camera module 602. The camera module 602 notifies the network driver 614 of the new video chat session as indicated at reference number 704. The camera module 602 also notifies the encode module 610A of the graphics driver of the new video chat session as indicated at reference number 706. The camera module 602 then sends null video frames to the video chat application 608 as indicated at reference number 708. The captured video data is sent from the camera hardware to the encode module 610A of the graphics driver as indicated at reference number 710. The encode module 610A of the graphics driver initializes the encode hardware of the graphics subsystem as indicated at reference number 712. The encode hardware of the graphics subsystem then encodes the incoming video data as indicated at reference number 714. The encode module 610A of the graphics driver then causes the encoded video data to be sent to the network hardware as indicated at reference number 716. The corresponding audio data is also sent from the video chat application 608 to the network hardware in a packet as indicated at reference number 718. The network driver 614 initializes the port used to transmit the video chat data as indicated at reference number 720. The encoded data may be stored as indicated at reference number 722. The encoded data is then repackaged into the packet with the audio data from the video chat application as shown at reference number 724. The repackaged packet may be transmitted across a network at reference number 726.

Figure 8:
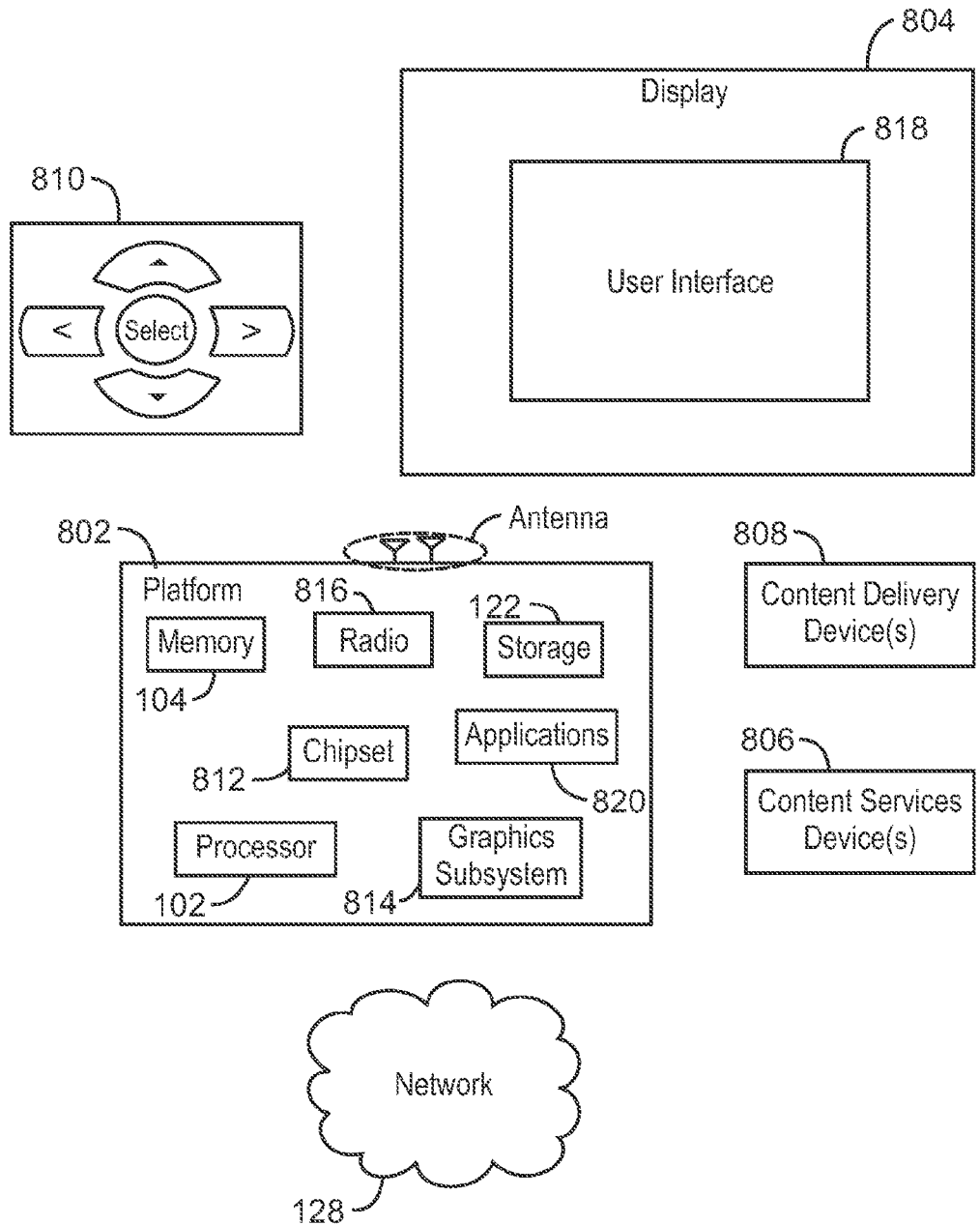
FIG. 8 is a block diagram of an exemplary system that processes video chat data.

FIG. 8 is a block diagram of an exemplary system 800 that processes video chat data. Like numbered items are as described with respect to FIG. 1. In some embodiments, the system 800 is a media system. In addition, the system 800 may be incorporated into a personal computer (PC), laptop computer, ultra-laptop computer, server computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, a printing device, an embedded device or the like.

In various embodiments, the system 800 comprises a platform 802 coupled to a display 804. The platform 802 may receive content from a content device, such as content services device(s) 806 or content delivery device(s) 808, or other similar content sources. A navigation controller 810 including one or more navigation features may be used to interact with, for example, the platform 802 and/or the display 804. Each of these components is described in more detail below.

The platform 802 may include any combination of a chipset 812, a central processing unit (CPU) 102, a memory device 104, a storage device 122, a graphics subsystem 814, applications 820, and a radio 816. The chipset 812 may provide intercommunication among the CPU 102, the memory device 104, the storage device 122, the graphics subsystem 814, the applications 820, and the radio 816. For example, the chipset 812 may include a storage adapter (not shown) capable of providing intercommunication with the storage device 122. The applications 820 may be the applications 114, the applications 202, or the applications 502 as described above. The components of the system 800 may be implemented as a system on chip (SOC). In an SOC implementation, all components of the platform 802 are combined onto a single chip substrate.

The CPU 102 may be implemented as Complex Instruction Set Computer (CISC) or Reduced Instruction Set Computer (RISC) processors, x86 instruction set compatible processors, multi-core, or any other microprocessor or central processing unit (CPU). In some embodiments, the CPU 102 includes multi-core processor(s), multi-core mobile processor(s), or the like. The memory device 104 may be implemented as a volatile memory device such as, but not limited to, a Random Access Memory (RAM), Dynamic Random Access Memory (DRAM), or Static RAM (SRAM). The storage device 122 may be implemented as a non-volatile storage device such as, but not limited to, a magnetic disk drive, optical disk drive, tape drive, solid state drive, an internal storage device, an attached storage device, flash memory, battery backed-up SDRAM (synchronous DRAM), and/or a network accessible storage device. In some embodiments, the storage device 122 includes technology to increase the storage performance enhanced protection for valuable digital media when multiple hard drives are included, for example.

The graphics subsystem 814 may perform processing of images such as still or video for display. The graphics subsystem 814 may include a graphics processing unit (GPU), such as the GPU 108, or a visual processing unit (VPU), for example. An analog or digital interface may be used to communicatively couple the graphics subsystem 814 and the display 804. For example, the interface may be any of a High-Definition Multimedia Interface, DisplayPort, wireless HDMI, and/or wireless HD compliant techniques. The graphics subsystem 814 may be integrated into the CPU 102 or the chipset 812. Alternatively, the graphics subsystem 814 may be a stand-alone card communicatively coupled to the chipset 812.

The graphics and/or video processing techniques described herein may be implemented in various hardware architectures. For example, graphics and/or video functionality may be integrated within the chipset 812. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 816 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 816 may operate in accordance with one or more applicable standards in any version.

The display 804 may include any television type monitor or display. For example, the display 804 may include a computer display screen, touch screen display, video monitor, television, or the like. The display 804 may be digital and/or analog. In some embodiments, the display 804 is a holographic display. Also, the display 804 may be a transparent surface that may receive a visual projection. Such projections may convey various forms of information, images, objects, or the like. For example, such projections may be a visual overlay for a mobile augmented reality (MAR) application. Under the control of one or more applications 820, the platform 802 may display a user interface 818 on the display 804.

The content services device(s) 806 may be hosted by any national, international, or independent service and, thus, may be accessible to the platform 802 via the Internet, for example. The content services device(s) 806 may be coupled to the platform 802 and/or to the display 804. The platform 802 and/or the content services device(s) 806 may be coupled to a network 128 to communicate (e.g., send and/or receive) media information to and from the network 128. The content delivery device(s) 808 also may be coupled to the platform 802 and/or to the display 804.

The content services device(s) 806 may include a cable television box, personal computer, network, telephone, or Internet-enabled device capable of delivering digital information. In addition, the content services device(s) 806 may include any other similar devices capable of unidirectionally or bidirectionally communicating content between content providers and the platform 802 or the display 804, via the network 124 or directly. It will be appreciated that the content may be communicated unidirectionally and/or bidirectionally to and from any one of the components in the system 800 and a content provider via the network 124. Examples of content may include any media information including, for example, video, music, medical and gaming information, and so forth.

The content services device(s) 806 may receive content such as cable television programming including media information, digital information, or other content. Examples of content providers may include any cable or satellite television or radio or Internet content providers, among others.

In some embodiments, the platform 802 receives control signals from the navigation controller 810, which includes one or more navigation features. The navigation features of the navigation controller 810 may be used to interact with the user interface 818, for example. The navigation controller 810 may be a pointing device or a touchscreen device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combinations thereof. Such physical gestures can be recognized and translated into commands or instructions.

Movements of the navigation features of the navigation controller 810 may be echoed on the display 804 by movements of a pointer, cursor, focus ring, or other visual indicators displayed on the display 804. For example, under the control of the applications 820, the navigation features located on the navigation controller 810 may be mapped to virtual navigation features displayed on the user interface 818. In some embodiments, the navigation controller 810 may not be a separate component but, rather, may be integrated into the platform 802 and/or the display 804.

The system 800 may include drivers (not shown) that include technology to enable users to instantly turn on and off the platform 802 with the touch of a button after initial boot-up, when enabled, for example. Program logic may allow the platform 802 to stream content to media adaptors or other content services device(s) 806 or content delivery device(s) 808 when the platform is turned "off." In addition, the chipset 812 may include hardware and/or software support for 6.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 800 may be integrated. For example, the platform 802 and the content services device(s) 806 may be integrated; the platform 802 and the content delivery device(s) 808 may be integrated; or the platform 802, the content services device(s) 806, and the content delivery device(s) 808 may be integrated. In some embodiments, the platform 802 and the display 804 are an integrated unit. The display 804 and the content service device(s) 806 may be integrated, or the display 804 and the content delivery device(s) 808 may be integrated, for example.

The system 800 may be implemented as a wireless system or a wired system. When implemented as a wireless system, the system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 802 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 8.

Figure 9:
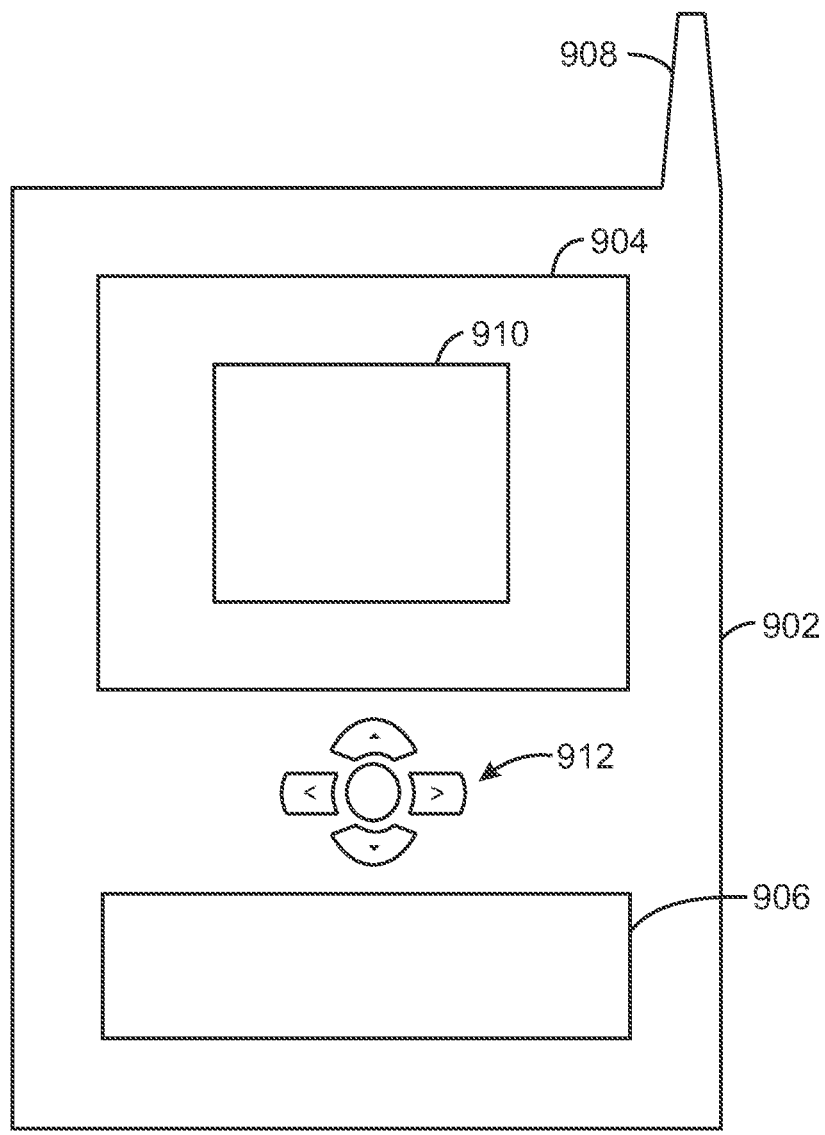
FIG. 9 is a schematic of a small form factor device in which the system of FIG. 8 may be embodied.

FIG. 9 is a schematic of a small form factor device 900 in which the system 800 of FIG. 8 may be embodied. Like numbered items are as described with respect to FIG. 8. In some embodiments, for example, the device 900 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, server computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wired or wireless mobile computing devices as well.

As shown in FIG. 9, the device 900 may include a housing 902, a display 904, an input/output (I/O) device 906, and an antenna 908. The device 900 may also include navigation features 912. The display 904 may include any suitable display 910 unit for displaying information appropriate for a mobile computing device. The I/O device 906 may include any suitable I/O device for entering information into a mobile computing device. For example, the I/O device 906 may include an alphanumeric keyboard, a numeric keypad, a touch pad, input keys, buttons, switches, rocker switches, microphones, speakers, a voice recognition device and software, or the like. In other examples, the device 900 may include a navigation controller 912 that can be used for entering information into the mobile computing device. Information may also be entered into the device 900 by way of microphone. Such information may be digitized by a voice recognition device.

Figure 10:
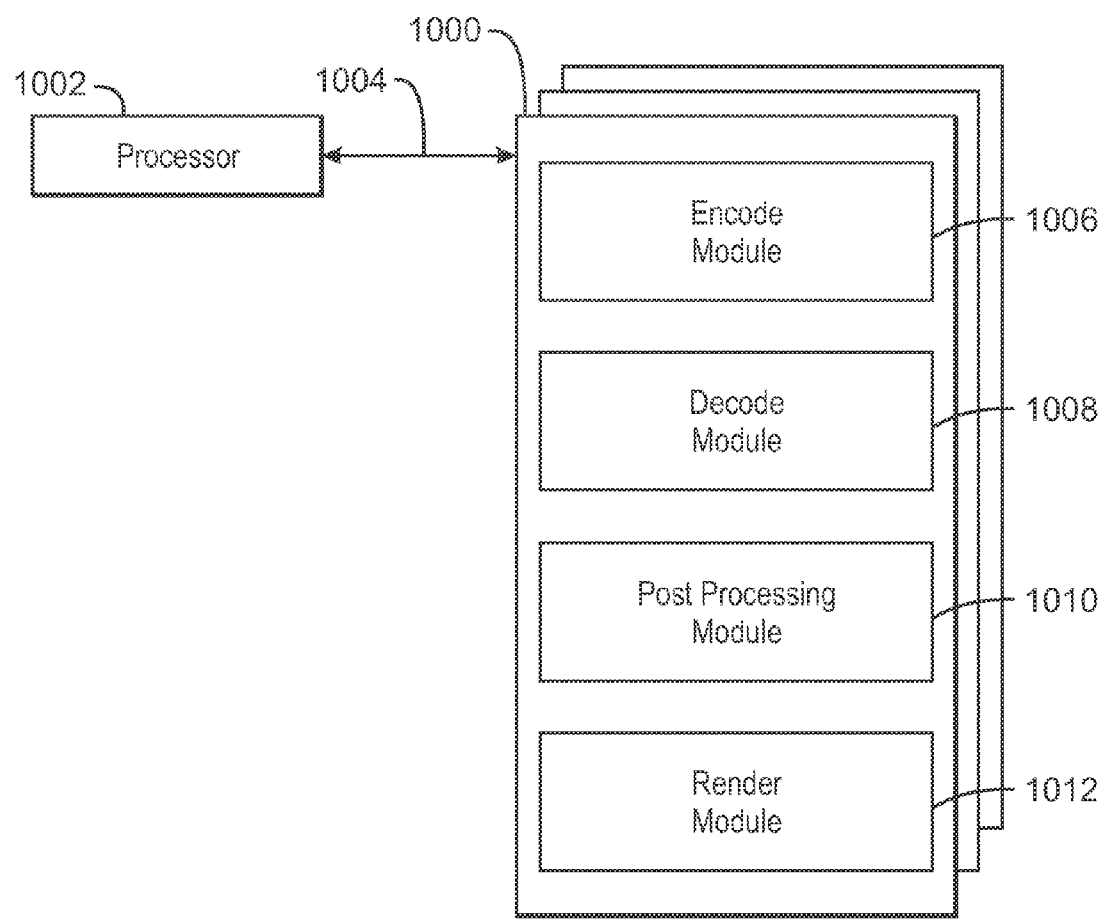
FIG. 10 is a block diagram showing tangible, non-transitory computer-readable media that stores code for video chat data processing.

FIG. 10 is a block diagram showing tangible, non-transitory computer-readable media 1000 that stores code for a video chat data processing. The tangible, non-transitory computer-readable media 1000 may be accessed by a processor 1002 over a computer bus 1004. Furthermore, the tangible, non-transitory computer-readable medium 1000 may include code configured to direct the processor 1002 to perform the methods described herein.

The various software components discussed herein may be stored on one or more tangible, non-transitory computer-readable media 1000, as indicated in FIG. 10. For example, an encode module 1006 may be configured to cause the graphics subsystem to encode image data. A decode module 1008 may be configured to cause the graphics subsystem to decode incoming data packets received from a network. A post-processing module 1010 may be configured to cause the graphics subsystem to perform post-processing of the decoded video data. Further, a render module 1012 may be used to cause the graphics subsystem to render video data.

The block diagram of FIG. 10 is not intended to indicate that the tangible, non-transitory computer-readable media 1000 is to include all of the components shown in FIG. 10. Further, the tangible, non-transitory computer-readable media 1000 may include any number of additional components not shown in FIG. 10, depending on the details of the specific implementation.

Example 1

A graphics processing unit is described herein. The graphics processing unit includes a decoder. The decoder is to decode a video data stream from an incoming data stream. The graphics processing unit also includes a post processor. The post processor is to perform post-processing of the decoded video data stream. Additionally, the graphics processing unit includes a renderer. The renderer is to render the post processed video data stream and discard a null video data stream from a video chat application during a video chat session.

A device driver that may detect the video chat session so that the video data stream from the incoming data is sent to the decoder, and the null video stream is sent to the video chat application. The incoming data stream may include the video data stream and an audio data stream, and the video chat application may receive the audio data stream and the null video data stream. The decoder may decode the video data stream according to a codec of the video chat application. Additionally, post processing the decoded data stream may include any image enhancements to the video data stream. Further, hints may be used to detect a new video chat session.

Example 2

A system is described herein. The system includes an encoder, and the encoder is to encode image data. The system also includes a multiplexer, and the multiplexer is to repackage the encoded image data with a data packet from a video chat application during a video chat session. Additionally, the system includes networking logic, and the networking logic is to transmit the repackaged data packet across a network.

The encoder may encode the video data stream according to a codec of the video chat application. An image capture device may capture image data and send the image data to the encoder. The image capture device may also send null image data to the video chat application. The data packet from the video chat application may include null image data and audio data from the video chat session. A renderer may render the image data using the video chat application during the video chat session. Hints may be used to detect a new video chat session.

Example 3

A system is described herein. The system includes a display, a radio, and a memory that is to store instructions and that is communicatively coupled to the display. The system also includes a processor communicatively coupled to the radio and the memory, wherein when the processor is to execute the instructions, the processor is to detect a video chat session by an application. The processor also encodes image data that is to be transmitted across a network, wherein a graphics subsystem encodes the image data from an image capture device and the application receives null image data from an image capture device. Additionally, the processor decodes incoming data packets received from the network, wherein networking logic rips the encoded video data from the incoming data packets and sends the encoded video data to the graphics subsystem to be decoded, and the networking logic sends null video data to the application. The processor may be a graphics processing unit. Additionally, the system may be a system on chip. Further, the encode and decode functions may be performed by the processor instead of the application.

Example 4

A tangible, non-transitory, computer-readable medium comprising code to direct a processor is described herein. The code may direct the processor to encode image data that is to be transmitted across a network, wherein the processor encodes the image data instead of a video chat application. The code may also direct the processor to decode incoming data packets received from the network, wherein encoded image data is ripped from the incoming data packets and sent to the processor to be decoded.

The image data may be received from an image capture device. Additionally, the video chat application may encode null video data when the processor encodes the image data. The video chat application may receive null data packets when the processor receives encoded image data.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A graphics processing unit, comprising:
   a decoder, wherein the decoder is to decode a video data stream from an incoming data stream, wherein the incoming data stream includes the video data stream and a null video data stream, wherein the null video data stream is used as a place holder during processing of the video data stream and is sent to a video chat application;
   a post processor, wherein the post processor is to perform post-processing of the decoded video data stream; and
   a renderer, wherein the renderer is to render the post processed video data stream and is to discard the null video data stream, and wherein a device driver renders the post processed video data stream from a graphic subsystem onto a surface.

2. The graphics processing unit of claim 1, wherein the device driver is to detect a video chat session so that the video data stream from the incoming data stream is sent to the decoder.

3. The graphics processing unit of claim 1, wherein the incoming data stream is to include the video data stream and an audio data stream.

4. The graphics processing unit of claim 3, wherein the video chat application is to receive the audio data stream and the null video data stream.

5. The graphics processing unit of claim 1, wherein the decoder is to decode the video data stream according to a codec of the video chat application.

6. The graphics processing unit of claim 1, wherein the post processing of the decoded video data stream includes image enhancements to the decoded video data stream.

7. The graphics processing unit of claim 1, wherein hints are used to detect a new video chat session.

8. A system, comprising:
an encoder, wherein the encoder is to receive image data from a video chat application, and wherein the encoder is to encode the image data;
a multiplexer, wherein the multiplexer is to repackage the encoded image data received from a graphics subsystem with a data packet from the video chat application during a video chat session to form a repackaged data packet, wherein the repackaged data packet comprises audio data and null video data;
networking logic to transmit the repackaged data packet across a network; and
a decoder, wherein the repackaged data packet is to be received from the network, wherein the networking logic rips the encoded image data from the repackaged data packet and sends the encoded image data to the graphics subsystem, and the networking logic sends the null video data to the video chat application, and wherein the null video data is used as a place holder during processing of the image data; and
a renderer, wherein the renderer is to render post processed encoded image data and is to discard the null video data, and wherein a device driver renders the post processed encoded image data from the graphics subsystem onto a surface.

9. The system of claim 8, the encoder is to encode the image data according to a codec of the video chat application.

10. The system of claim 8, wherein an image capture device is to capture the image data and send the image data to the encoder.

11. The system of claim 10, wherein the image capture device is to send the null video data to the video chat application.

12. The system of claim 8, wherein the data packet from the video chat application includes null video data and audio data from the video chat session.

13. The system of claim 8 comprising a renderer, wherein the renderer is to render the image data using the video chat application during the video chat session.

14. The system of claim 8, wherein hints are used to detect a new video chat session.

15. A system, comprising:
a display;
a radio;
a memory that is to store instructions and that is communicatively coupled to the display; and
a processor communicatively coupled to the radio and the memory, wherein when the processor is to execute the instructions, the processor is to:
detect a video chat session by an application;
encode image data that is to be transmitted across a network, wherein a graphics subsystem encodes the image data from an image capture device and the application receives null image data from an image capture device; and
decode incoming data packets received from the network, wherein networking logic rips the encoded video data from the incoming data packets and sends the encoded video data to the graphics subsystem to be decoded, and the networking logic sends the null image data to the application, and wherein the null image data stream is used as a place holder during processing of the image data.

16. The system of claim 15, wherein the processor is a graphics processing unit.

17. The system of claim 15, wherein the system is a system on chip.

18. The system of claim 15, wherein encode and decode functions are performed by the processor instead of the application.

19. A non-transitory, computer-readable medium comprising code to direct a processor to:
encode image data received from a graphics subsystem that is to be transmitted across a network, wherein the processor encodes the image data instead of a video chat application, and wherein the encoded image data is inserted into incoming data packets; and
decode the incoming data packets received from the network, wherein the encoded image data is ripped from the incoming data packets and sent to the processor to be decoded, and wherein a null video data stream is used as a place holder during processing of the image data and is sent to a video chat application.

20. The computer readable medium of claim 19, wherein the image data is received from an image capture device.

21. The computer readable medium of claim 19, wherein the video chat application encodes the null video data stream when the processor encodes the image data.

22. The computer readable medium of claim 19, wherein the video chat application receives null data packets when the processor receives the encoded image data.

* * * * *